United States Patent Office 3,793,462
Patented Feb. 19, 1974

3,793,462
TREATMENT OF SCLEROSES
Martin Kludas, 22 Herastr., 1 Berlin 33, Germany
No Drawing. Filed Oct. 16, 1970, Ser. No. 81,626
Int. Cl. A61k 27/00
U.S. Cl. 424—319                    15 Claims

ABSTRACT OF THE DISCLOSURE

Scleroses conditions are treated by administering to a subject requiring the same an effective dose of penicillamine. The preferred penicillamine because of its low toxicity is D-penicillamine. All types of administration are suitable, including oral administration and administration by injection. The actual dosage depends upon the condition treated and the extent of the condition and orally it may be as little as 0.6 g. per day and as high as 2.4 g. per day, and even higher for short periods. By injection the dose may be as little as 0.5 g. and as high as 1.5 g.

BACKGROUND OF THE INVENTION

Numerous conditions of sclerosis are known including multiple sclerosis, otosclerosis and arteriosclerosis. These are all dread diseases for which no remedy has as yet been found.

According to Mayer, Truebestein and Diefenbach in Med. Welt. 1970, 392, the cause of multiple sclerosis (MS) has not yet been clarified. No causal therapy is known. For the past ten to twelve years, the treatment of the disease has been principally carried out with ACTH or corticosteroids. The opinions and the results communicated in connection with the therapeutic activity of these substances in the treatment of MS have been contradictory. Comparative controls have not shown with any certainty that there is any therapeutic activity of these drugs in the treatment of MS. Above all, once the disease has commenced, there has been no way to check it.

Cortisone therapy must be considered as useless chiefly because it causes undesirable side effects such as Cushing's syndrome or osteoporosis.

In the case of otosclerosis attempts have been made with more or less success to improve the hearing ability operatively. Arteriosclerosis has been treated symptomatically, for example by diet, with some degree of success. The rigidity of the connected tissue however apparently can be normalized only by biochemical means, in accordance with the present invention, as will be described further below.

SUMMARY OF THE INVENTION

Generally speaking, in accordance with the present invention, a subject suffering from a condition of sclerosis, such as multiple sclerosis, otosclerosis or arteriosclerosis, is administered an effective dose of penicillamine, particularly D-penicillamine.

It is a primary object of the present invention to provide for the treatment of the conditions mentioned herein, namely scleroses by means of a drug which is highly effective in attacking the manifestations thereof.

It is another object of the present invention to provide for the treatment of multiple sclerosis wherein not only is an immunosuppressive action achieved, but in which direct action is taken on the connective tissues.

It is still a further object of the present invention to provide for the treatment of otosclerosis in which the ridigidty of the connective tissues is normalized.

It is still a further object of the present invention to provide for the treatment of arteriosclerosis wherein the hardening of the connective tissues is normalized.

Other objects and advantages of the present invention will be apparent from a further reading of the specification and of the appended claims.

With the above and other objects in view, the present invention mainly comprises the treatment of a sclerosis by administration to the subject suffering from such condition of an effective amount of penicillamine.

Although the L-isomer and the DL-isomer of penicillamine are both active for the same purposes as the D-penicillamine, their toxicity is so much higher than D-penicillamine, that as a practical matter the D-penicillamine is used for the purpose of the present invention.

The use of the penicillamine for the treatment of MS is particularly advantageous since it acts in two respects, namely in an immunosuppressive manner and also its acts in connection with the connective tissue. The action of penicillamine in the treatment of MS in arresting of collagen synthesis, besides its immunosuppressive action, is highly significant since in all scleroses the collagen fibers thicken and cross link. The collagen becomes insoluble with scar formation. Penicillamine increases the soluble portion of the collagens and thereby changes its proportion to normal. This action of the penicillamine is of importance not only in the treatment of MS but also in the treatment of other scleroses.

Thus, the rigidity of the connective tissue in cases of otosclerosis is normalized biochemically by treatment with penicillamine in accordance with the present invention. Thus, the treatment with penicillamine constitutes a considerable technical advance in that the true cause of the disease, namely the hardening of the connective tissue is treated.

Since arteriosclerosis constitutes an essential constituent of gerontology, the use of penicillamine in accordance with the present invention is particularly advantageous in geriatrics. It is said that a man is as old as his connective tissue, that is with increasing age there is a decrease in the soluble collagen fraction, the connective tissue becomes more and more insoluble, it stiffens and becomes sclerotic, which then manifests itself in various organs or portions of organs.

Although the scope of the invention is not meant to be limited to any specific theory of operation, the following theory as to how the penicillamine acts for the purposes of the present invention is given in the hope that it will help others to further advance the art.

The cross linking of collagen plays an important role in the case of all scleroses. The aldehyde groups play a key role therein. It is believed that penicillamine acts intramolecular in that it blocks the aldehyde groups through thiazolidine formation and the cross linking of the α-chain is inhibited. On the other hand, the penicillamine acts intermolecular by reversibly splitting and freeing the aldehyde groups by amino group exchange or in case of already cross linked collagens by nucleophyllic action.

As a result of these two types of actions the maturing process is inhibited (by the binding of the aldehyde by the pencillamine), and the maturing process is caused to reverse (by the breaking of the aldehyde bridges of the cross linking).

The dosage of the penicillamine of course depends upon the extent of the condition being treated. Thus, the higher the degree of cross linking and the more insoluble collagens, the higher the dosage of the penicillamine required to achieve the therapeutic effect. Likewise, the duration of administration is also dependent upon the degree of cross linking and amount of scar formation.

In most cases a suitable dosage program would be the administration of 0.3 g. of D-penicillamine for one week, then increasing the dosage by 0.3 g. per day for an additional week until the full dosage of 1.8 g. per day is arrived at. This dosage program is most desired in order to avoid any side effects.

After achieving the therapeutic effect, the dosage can be reduced to 0.6 g. per day and then later completely eliminated.

In particularly difficult cases of scleroses it is possible to increase the daily dosage for a short time up to a daily dosage of 5 g. D-penicillamine.

It is generally satisfactory to administer the penicillamine orally. In the case of highly advanced conditions it may be advisable to use a higher dosage, particularly at the beginning of the treatment, and in such case a dosage of 1 g. of the D-penicillamine intravenously is advantageous.

The penicillamine may be used for the purposes of the present invention in the form of its free base or in the form of an acid addition salt thereof, particularly of a mineral acid, such as hydrocholric acid.

In the preparation of products for oral administration or for administration by injection it is desirable to avoid the presence of oxygen which causes deterioration of the pharmaceutical action as a result of autoxidation with formation of penicillamine-disulfide. In order to avoid contact with the air, it is advisable to provide the oral form in air-tight, sealed hard gelatin capsules or in air-tight tablet form.

For parenteral administration the penicillamine may be in the form of a solution, however in a special form which minimizes decomposition of the penicillamine and also does not harm the patient upon injection through the skin. Since the mineral acid addition salt of penicillamine, such as D-penicillamine-hydrocholride are quite acid (pH of about 2) the solution of the acid addition salt in water for injection should have buffers added thereto in order to increase the pH of the solution. Among the suitable buffers for this purpose are tris (hydroxyamino) methane, borox-succinic acid buffer of Kolthoff, citrate buffer of Sorensen, citric acid-phosphate buffer of McIlvaine, glycocol buffer of Sorensen, potassium biphthalate buffer of Clark and Lubs, standard acetate buffer of Michaelis and others.

For oral administration, the minimum daily dose is generally about 0.6 g. with a maximum of about 2.4 g. per day, the preferred oral administration being by means of tablets each containing 0.3 g., so that the daily administration of tablets is between 2 and 8 tablets per day. As indicated previously, however, for short periods of time, and in cases of severe scleroses, the daily dose may be as high as 5 g.

In the case of parenteral administration, which can be intravenous or intramuscular, with intravenous being preferred because of greater certainty of pharmacological action, the unit dose is between about 0.5 g. of D-penicillamine and 1.5 g. This dose is preferably administered as one injection per day. The preferred daily individual dose is about 1.0 g. of D-penicillamine.

Penicillamine may be used in accordance with the present invention not only in the treatment of scleroses in human beings, but also in animals. Thus, the penicillamine may be used for the treatment of scleroderma in dogs and horses, particularly scleroses of the serosa, the central nervous system, the endocardial system, the pericardial system, and of the ovaries. The penicillamine may also be used for the treatment of cirrhosis of the liver.

The oral dosage of penicillamine in the treatment of dogs and cats is generally between about 20 and 30 mg./kg. of body weight, and preferably about 25 mg./kg. The parenteral dosage is between about 10 and 20 mg./kg. and preferably about 15 mg./kg. of body weight.

In the case of horses and cattle, the oral daily dosage is generally between about 15 and 25 mg./kg. and preferably about 20 mg./kg. of body weight, the parenteral dosage being between about 5 and 15 mg./kg. and preferably about 10 mg./kg. of body weight.

DESCRIPTION OF PREFERRED EMBODIMENTS

The following example is given to further illustrate the present invention. The scope of the invention is not, however, meant to be limited to the specific details of the example.

EXAMPLE

A male patient is diagnosed as suffering from multiple sclerosis. At the start of the treatment the patient is given D-penicillamine orally in a daily dose of 0.3 g. (one tablet containing 0.3 g. D-penicillamine per day). The dosage is continued for three days and then increased another 0.3 g. The course of treatment is continued with a 0.3 g. increase in the daily dosage every third day until the daily dosage reaches 1.8 g. (six tablets per day).

After several weeks of this treatment the patient is found to have clinically improved with actual retarding of the thrust of the disease.

Similar courses of treatment can be used in connection with other scleroses.

While the invention has been illustrated in particular with respect to a particular course of treatment, it is apparent that variations and modifications of the invention can be made.

What is claimed is:

1. Method of treating a patient suffering from multiple sclerosis which comprises administering to such patient a multiple sclerosis effective amount of D-penicillamine.
2. Method according to claim 1 wherein the mode of administration is oral.
3. Method according to claim 1 wherein the mode of administration is parenteral.
4. Method according to claim 2 wherein the daily dose is between about 0.6 g. and 2.4 g.
5. Method according to claim 3 wherein the daily dose is between about 0.5 g. and 1.5 g.
6. Method of treating a patient suffering from otosclerosis, which comprises administering to such patient an otosclerosis effective amount of D-penicillamine.
7. Method according to claim 6 wherein the mode of administration is oral.
8. Method according to claim 6 wherein the mode of administration is parenteral.
9. Method according to claim 7 wherein the daily dose is between about 0.6 g. and 2.4 g.
10. Method according to claim 8 wherein the daily dose is between about 0.5 g. and 1.5 g.
11. Method of treating a patient suffering from arteriosclerosis, which comprises administering to such patient an arterio-sclerosis effective amount of D-penicillamine.
12. Method according to claim 11 wherein the mode of administration is oral.
13. Method according to claim 11 wherein the mode of administration is parenteral.
14. Method according to claim 12 wherein the daily dose is between about 0.6 g. and 2.4 g.
15. Method according to claim 13 wherein the daily dose is between about 0.5 g. and 1.5 g.

References Cited

UNITED STATES PATENTS

The Merck Index, 8th edition, 1968, Merck & Co., Inc., Rahway, N.J., p. 789.

STANLEY J. FRIEDMAN, Primary Examiner